(12) United States Patent
McCammon

(10) Patent No.: US 9,168,812 B2
(45) Date of Patent: Oct. 27, 2015

(54) DECORATIVE RING DEVICE FOR FREE-FLOATING INTERFACE OF AIRCRAFT INTERIOR SIDEWALL WINDOW LINING

(71) Applicant: The Boeing Company, Chicago, IL (US)

(72) Inventor: William E. McCammon, Bothell, WA (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 13/665,858

(22) Filed: Oct. 31, 2012

(65) Prior Publication Data

US 2014/0117160 A1     May 1, 2014

(51) Int. Cl.
*B64C 1/14*        (2006.01)
*B60J 1/20*        (2006.01)
*B64C 1/06*        (2006.01)

(52) U.S. Cl.
CPC . *B60J 1/20* (2013.01); *B64C 1/066* (2013.01); *B64C 1/1492* (2013.01); *Y10T 29/49622* (2015.01)

(58) Field of Classification Search
CPC ...... B64C 1/14; B64C 1/1476; B64C 1/1484; B64C 1/1492
USPC .................... 244/129.3, 129.4, 131
See application file for complete search history.

(56) References Cited

U.S. PATENT DOCUMENTS

| 4,364,533 | A | * | 12/1982 | Pompei et al. | ............. | 244/129.3 |
| 4,541,595 | A | * | 9/1985 | Fiala et al. | ................. | 244/129.3 |
| 5,676,272 | A | | 10/1997 | Baerenwald | | |
| 5,794,814 | A | | 8/1998 | Baerenwald | | |
| 6,227,491 | B1 | * | 5/2001 | Stephan et al. | ............ | 244/129.3 |
| 6,997,505 | B2 | * | 2/2006 | Dry et al. | .................... | 296/146.7 |
| 2003/0234322 | A1 | * | 12/2003 | Bladt et al. | ................. | 244/129.3 |
| 2006/0118676 | A1 | | 6/2006 | Novak | | |
| 2012/0241559 | A1 | | 9/2012 | Ebner | | |

FOREIGN PATENT DOCUMENTS

EP            0893341 A2     1/1999

\* cited by examiner

*Primary Examiner* — Tien Dinh
*Assistant Examiner* — Richard R Green
(74) *Attorney, Agent, or Firm* — Felix L. Fischer

(57) ABSTRACT

An interior lining interface incorporates a decorative interface ring having a substantially flat flange with multiple bearing ring bosses on an inner surface of the flange for engagement of an inner surface of a rim of a window ring. Multiple friction fit legs extend from the flange and are received within and constrained by the interface ring to the widow ring rim. A window reveal has a mating surface contacting the flange.

20 Claims, 14 Drawing Sheets

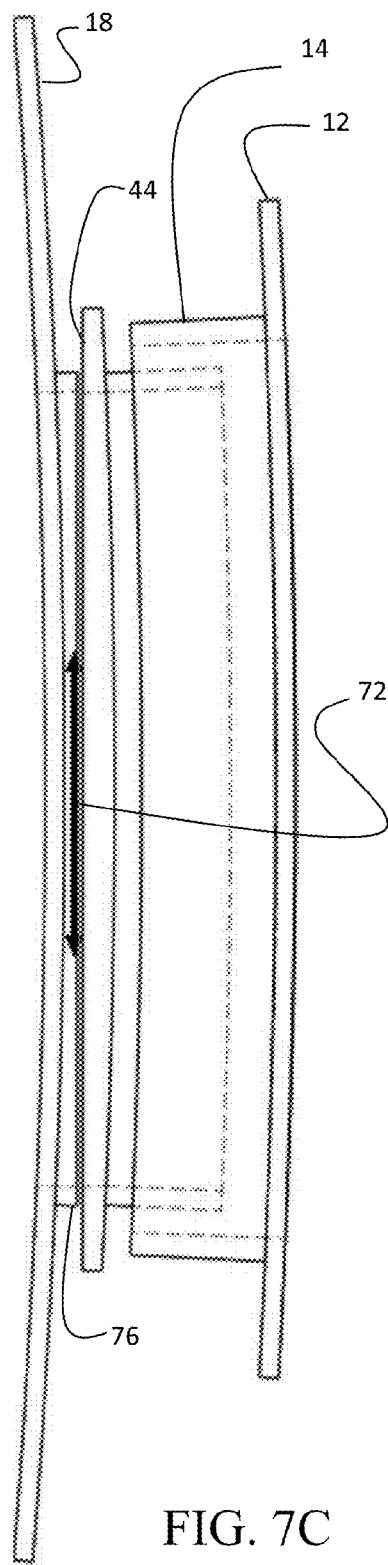 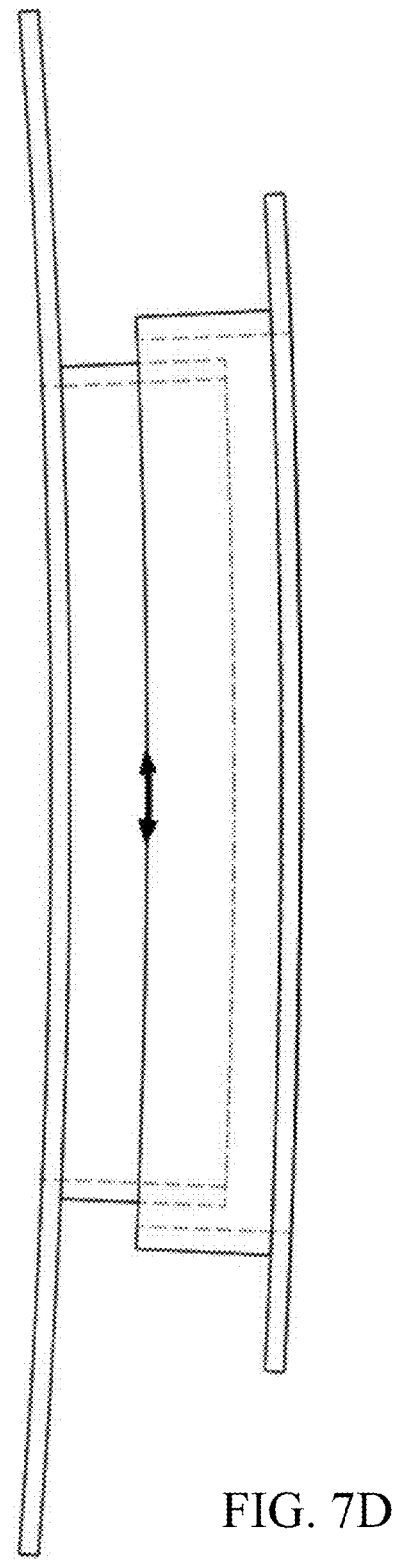
FIG. 7C
FIG. 7D
PRIOR ART

DECORATIVE RING DEVICE FOR FREE-FLOATING INTERFACE OF AIRCRAFT INTERIOR SIDEWALL WINDOW LINING

BACKGROUND INFORMATION

1. Field

Embodiments of the disclosure relate generally to the field of aircraft interiors and more particularly to a decorative ring having a flat presented face mountable within an aircraft structural window ring for low tolerance interface to interior sidewall window panels.

2. Background

Commercial aircraft as well as commercial busses and trains have interiors which employ sidewall linings that incorporate decorative window reveal assemblies to allow passengers to see out the cabin windows while maintaining an aesthetically pleasing cabin interior appearance. The structural window ring of the aircraft is a high tolerance assembly and the interface to the interior lining panels and window reveal assemblies in current installations requires alignment of the lining to the structure with tight tolerances fore and aft, vertically and rotationally ("clocking"). Many current installations employ a flexible bellows seal extending from the lining into the structural window ring which may impinge on window clips or other elements the aircraft window structure and which may result in an aesthetically unacceptable installation or require frequent or repeated rework to adjust and reinstall linings for proper fit.

It is therefore desirable to provide an interface for the aircraft interior lining window reveal which provides reduced tolerance requirements in forward/aft, vertical and clocking to enhance interior lining installation.

SUMMARY

Embodiments disclosed herein provide an interior lining interface incorporating a decorative interface ring having a substantially flat flange with multiple bearing ring bosses on an inner surface of the flange for engagement of an inner surface of a rim of a window ring. Multiple friction fit legs extend from the flange and are received within and constrained by the interface ring to the widow ring rim. A window reveal on the lining has a mating surface contacting the flange.

The embodiments may be employed in an aircraft fuselage window system having a window ring mounted in a fuselage and a lining panel supported within the fuselage. The decorative interface ring incorporates the flange with bearing ring bosses on the inner surface for engagement of the inner surface of the rim of the window ring. The friction fit legs extending from the flange are received within and constrained by the interface ring to the widow ring rim. A window reveal extending from the lining panel and has a mating surface contacting the flange.

The embodiments provide a method for establishing a low tolerance interface between a window ring and window reveal by extending multiple bearing ring bosses on a substantially flat flange of an interface ring and contouring mating surfaces of the bearing ring bosses to match curvature of an inner surface of a rim on a structural window ring to orient the flange with respect to the window ring. Fiction fit legs associated with the bosses are received and constrained within the rim of the window ring and the flange is contacted with a resilient seal extending from a window reveal.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

FIGS. 7C and 7D are side view comparisons of the free floating flat interface of the present embodiment as shown in FIGS. 7A and 7B and a prior art constrained curved liner interface;

DETAILED DESCRIPTION

Embodiments disclosed herein provide a decorative interface ring that installs directly to a structural window ring with fastening elements having matched orientation and shape. The interface ring is contoured to match the structural window ring interior profile and present a substantially flat low tolerance mating surface for interior lining sidewall window panels. The lining panels and associated window reveals may float against the mating surface with any misalignment mitigated by the mating surface.

Figure 1A:
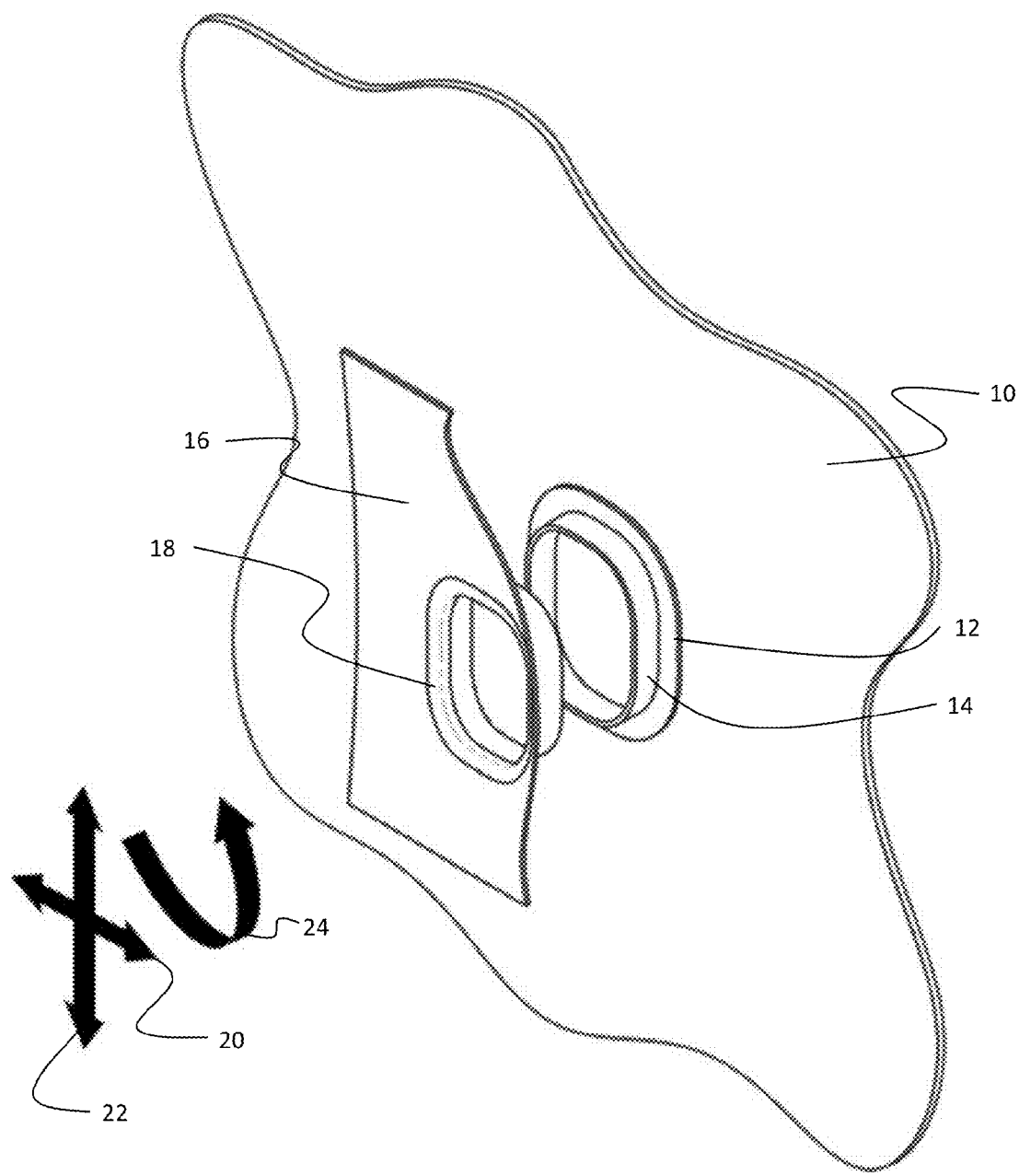
FIG. 1A is a pictorial exploded view of an aircraft fuselage interior and lining panel assembly showing the structural window ring interface and tolerance factors.
Figure 1B:
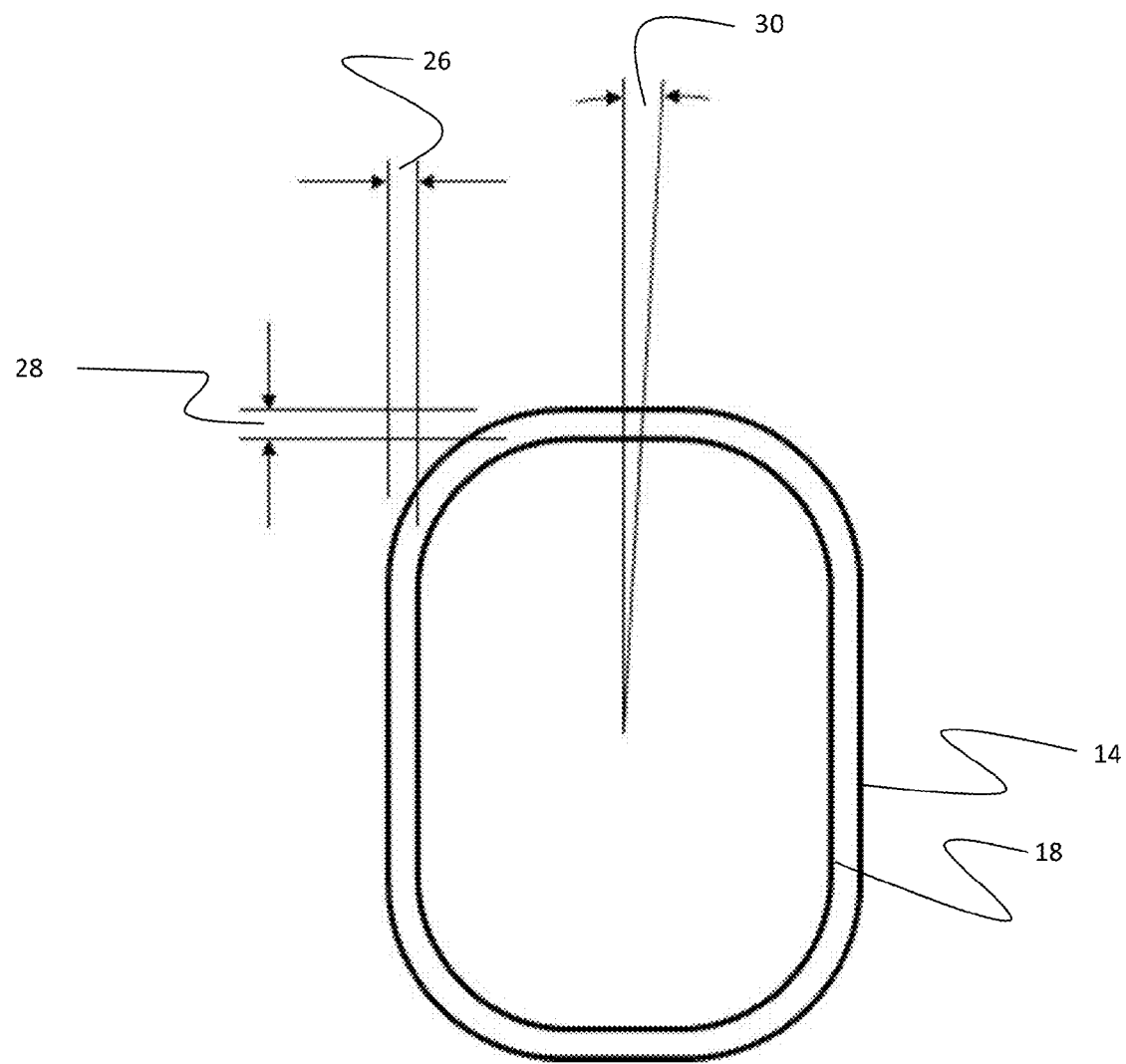
FIG. 1B is a front view of the structural window ring and the lining window reveal showing the tolerance factors.

As shown in FIG. 1A, a skin structure 10 of an aircraft fuselage incorporates structural window rings 12 that include protruding rims 14 that are employed for mounting of window elements as will be described in greater detail subsequently. Interior lining panel assemblies 16 are mounted within the fuselage and have window reveals 18 intended for alignment with the structural window ring to allow passengers a view through the window. The interior lining panels are subject to tolerance requirements for forward/aft adjustment as represented by arrow 20, up/down adjustment as represented by arrow 22 and rotational adjustment as represented by arrow 24 to align with the structural window ring. FIG. 1B shows representative adjustment tolerances for forward/aft adjustment 26, up/down adjustment 28 and rotational adjustment 30 of the window reveal 18 relative to the rim 14 of the window ring.

Figure 2:
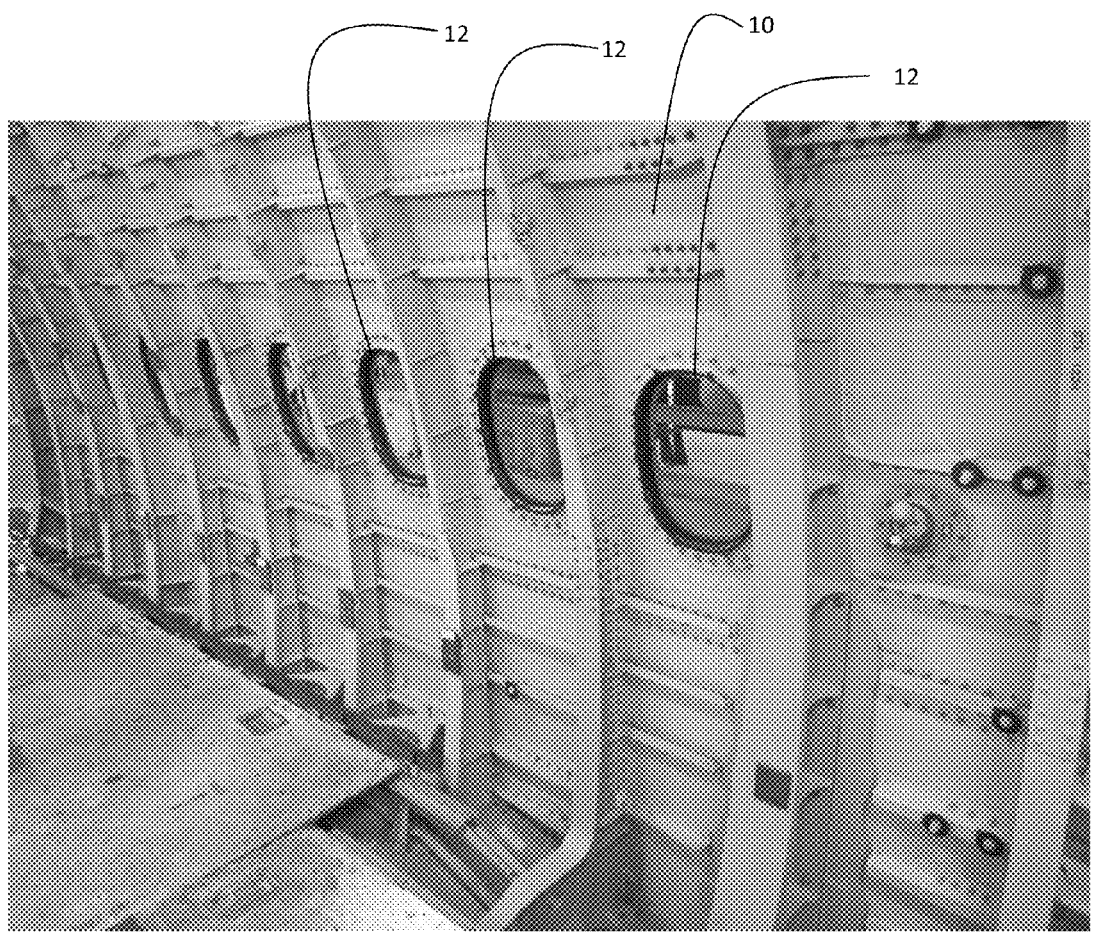
FIG. 2 is a perspective view of an example aircraft fuselage skin structure without the interior installed showing the structural window rings.

As shown in FIG. 2, a typical fuselage skin structure 10 will incorporate multiple spaced window rings 12. The adjacent spacing of the window rings additionally impacts the tolerancing of the installation of interior lining panels to accommodate reveals at each window.

Figure 3:
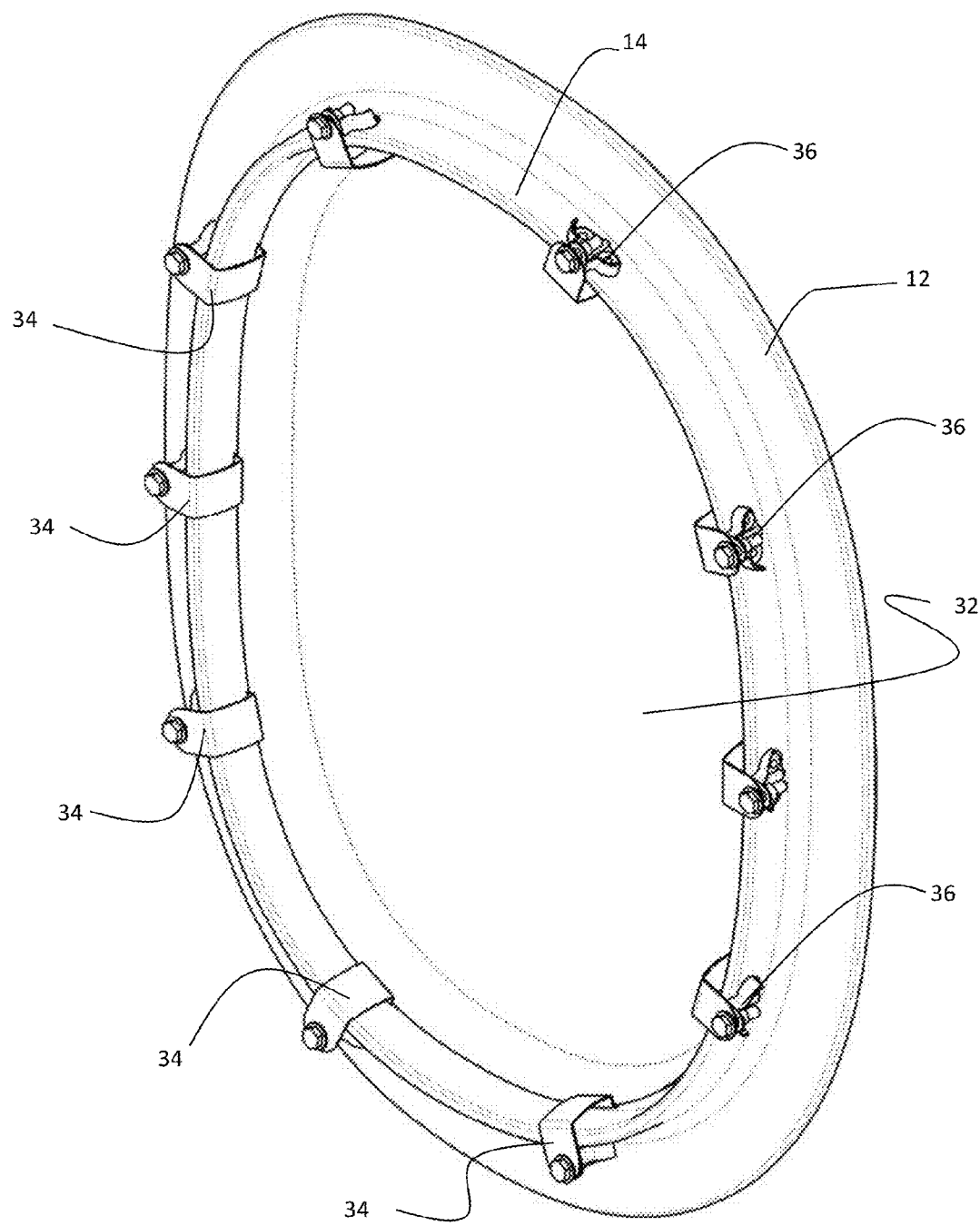
FIG. 3 is a pictorial view of a window structural ring in an aircraft.

Each window ring 12 employs the protruding rim 14 to engage window glass pane assemblies 32 as shown in FIG. 3. The window ring 12 provides critical structural support for the glass panels 32 in a pressurized condition of the fuselage during aircraft operation. Structural mounting hardware such as clips 34 secured to the rim 14 with engaging fasteners 36 secure the glass panels 32 within the window ring 12. An interface to the window ring must accommodate the contour of the rim and preferably provides clearance to avoid impingement on the clips and engaging fasteners or other structural mounting hardware.

Figure 4A:
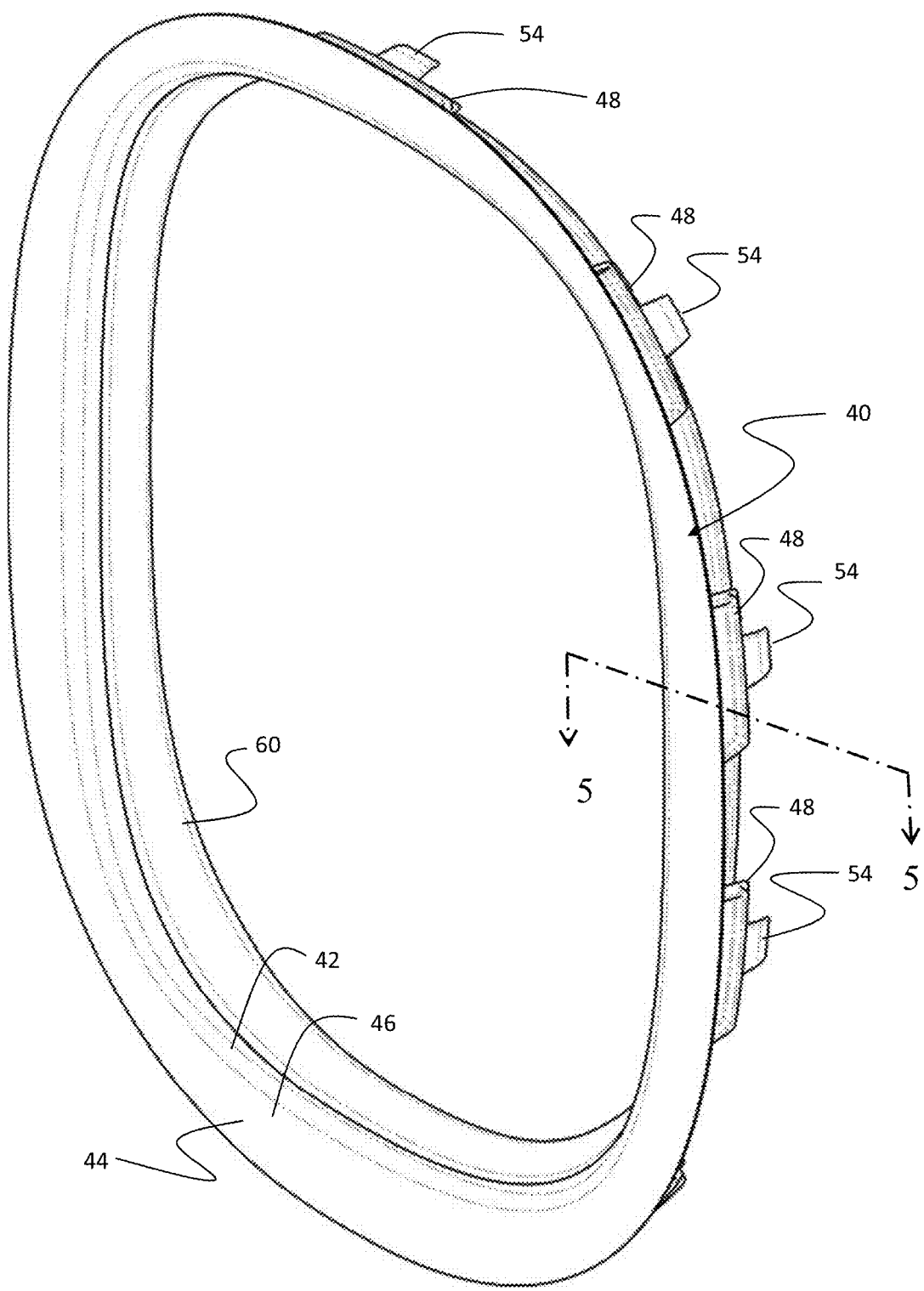
FIG. 4A is a front pictorial view of an embodiment of a decorative interface ring for installation in window structural ring.
Figure 4B:
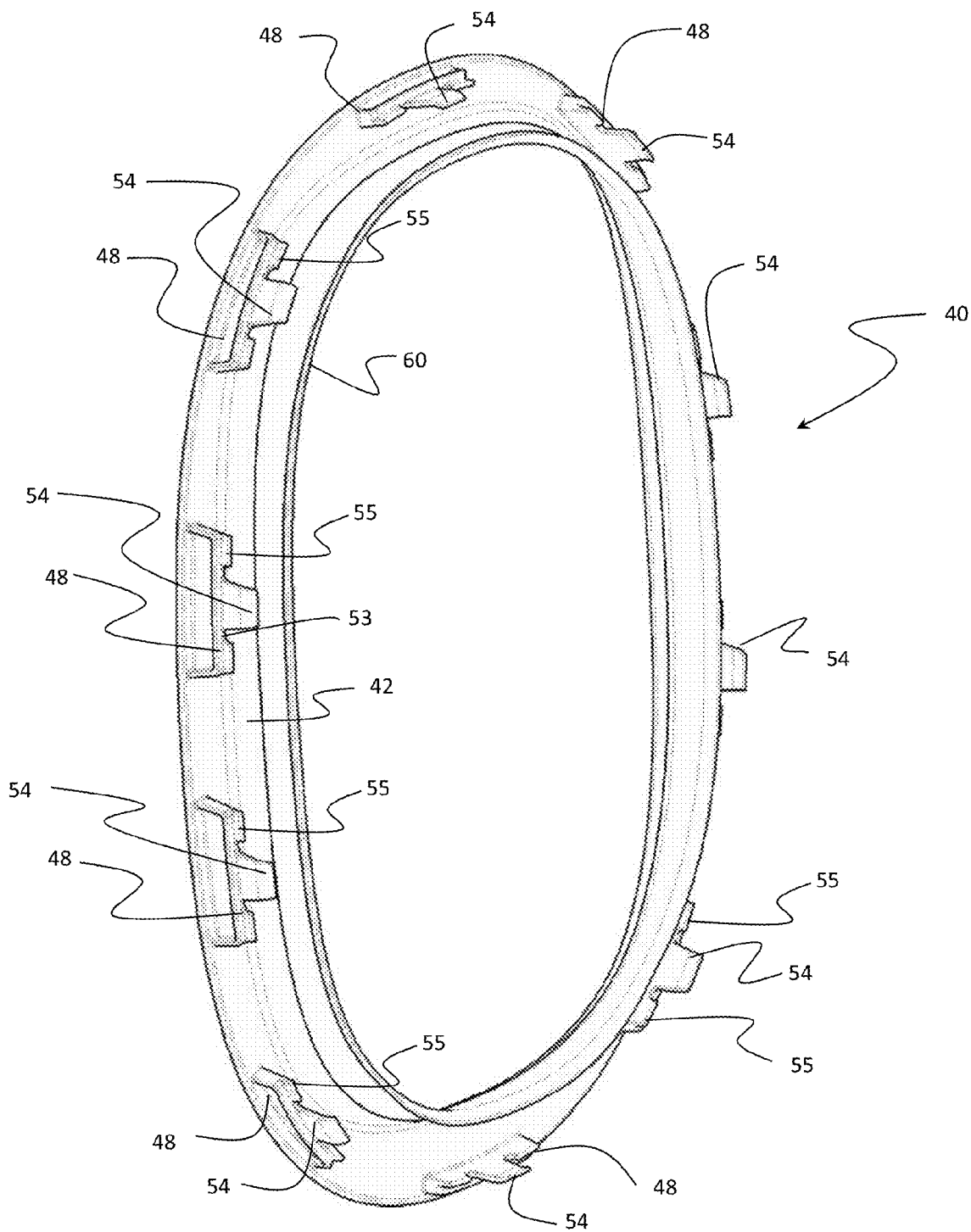
FIG. 4B is a rear pictorial view of the embodiment of the interface ring of FIG. 4A.
Figure 4C:
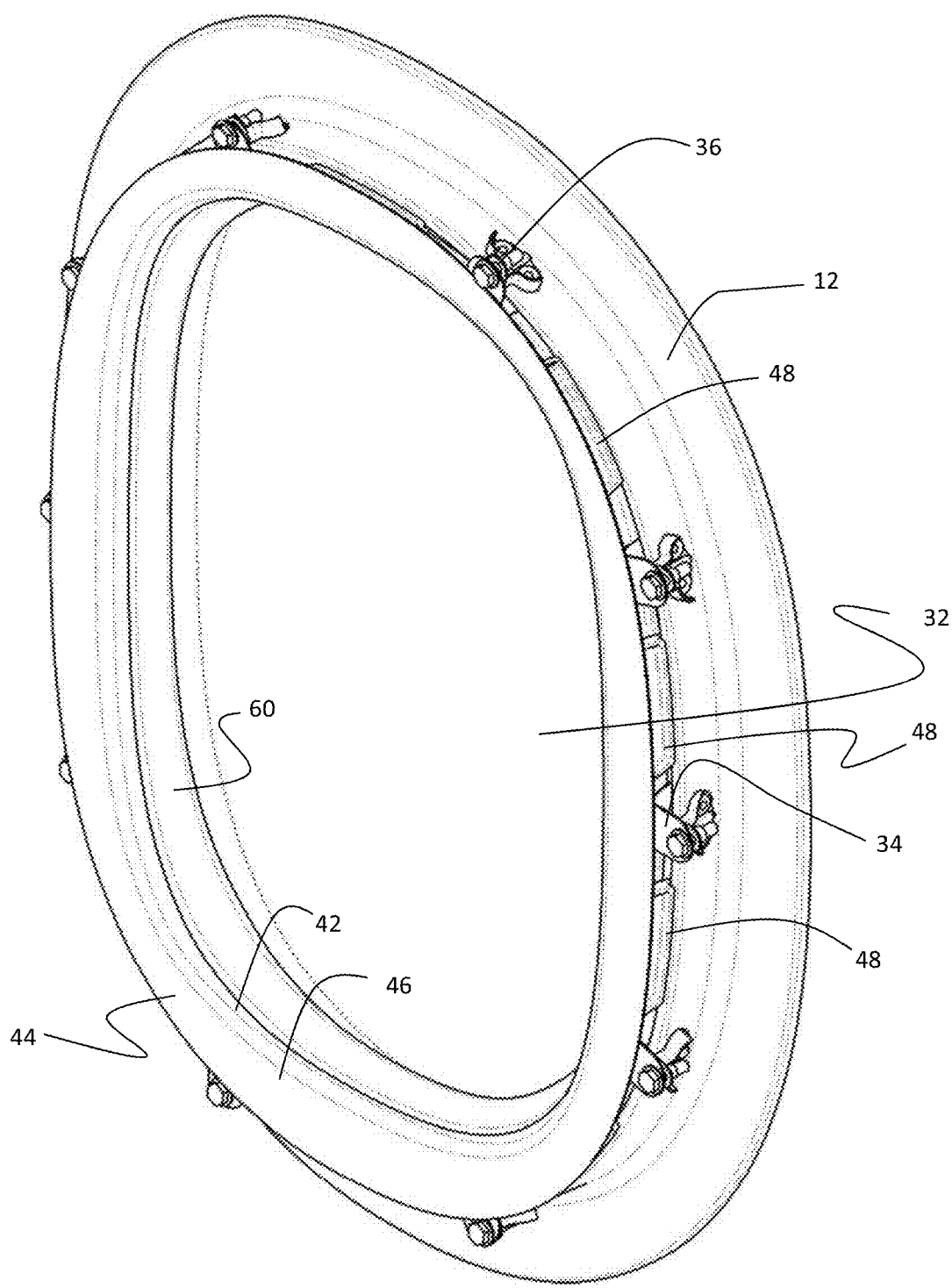
FIG. 4C is a front pictorial view of the decorative interface ring of FIGS. 4A and 4B as installed in the window ring of FIG. 3.
Figure 5:
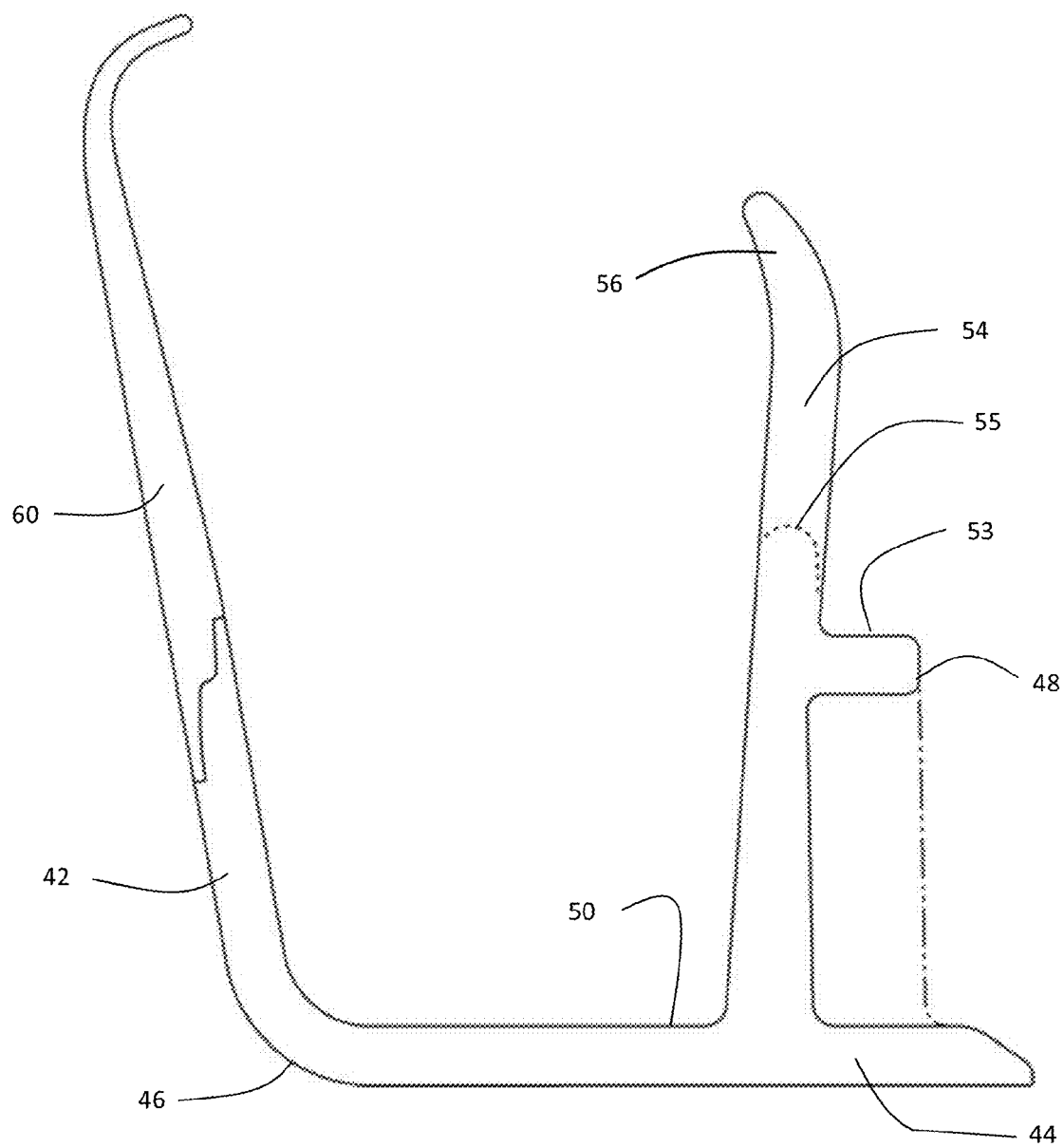
FIG. 5 is section view of the interface ring along line 5-5 of FIG. 4A

A decorative interface ring 40 shown in FIGS. 4A, 4B and 5 incorporates a central wall 42 to be received substantially concentrically within the rim 14 of the window ring 12, as will be described in greater detail subsequently. A substantially flat interface flange 44 extends peripherally from the central wall 42 with a joining radius 46 to provide a pleasing aesthetic appearance. The radius also mitigates misalignment to a similarly radiused mating part 76 or similar component part in the window reveal on the lining 18. Spaced bearing ring bosses 48 extend from an inner surface 50 of the interface flange 44 for contact with an inner edge 52 of the rim 14 of window ring 12 (shown in FIG. 6). The bearing ring bosses 48 each have a contoured face 53 to match the contour of the inner edge 52 of window ring rim 14 as will be described in greater detail subsequently. Associated with each ring boss 48 is a friction fit leg 54 which is received within the rim 14 and resiliently contacts an inner surface 58 of the rim 14 (also shown in FIG. 6). An angularly extending or bowed termination 56 on the friction fit leg allows easy insertion of the legs into the rim 14 of the window ring 12. The interface ring 40 is supported from the rim 14 of window ring 12 by the contoured faces 53 of the bearing ring bosses 48 and the friction fit legs 54. Also associated with the ring bosses 48 are aligning lips 55, which provide a bearing surface between the interface ring 40 and the inner surface of the window ring rim 14. These lips 55 are similar in profile to the friction fit legs 54, but extend only as far as needed to align the interface ring to the shape profile of the window ring. Spacing of the bearing ring bosses 48 and associated friction fit legs 54 prevents interference with the clips 34 and engaging fasteners 36 in the window ring 12.

Since each interface ring is a separate part not connected to the interior lining panels, a high tolerance fit to the window ring may be achieved. In exemplary embodiments, the interface ring 40 is molded from hard (high durometer) thermoplastic such as Radel (polyphenylsulfone (PPSV)) thermoplastic by Solvay Specialty Polymers) or Ultem Resin 8015 (polyetherimide (PEI) thermoplastic by Sabic) or similar composition materials.

Figure 6:
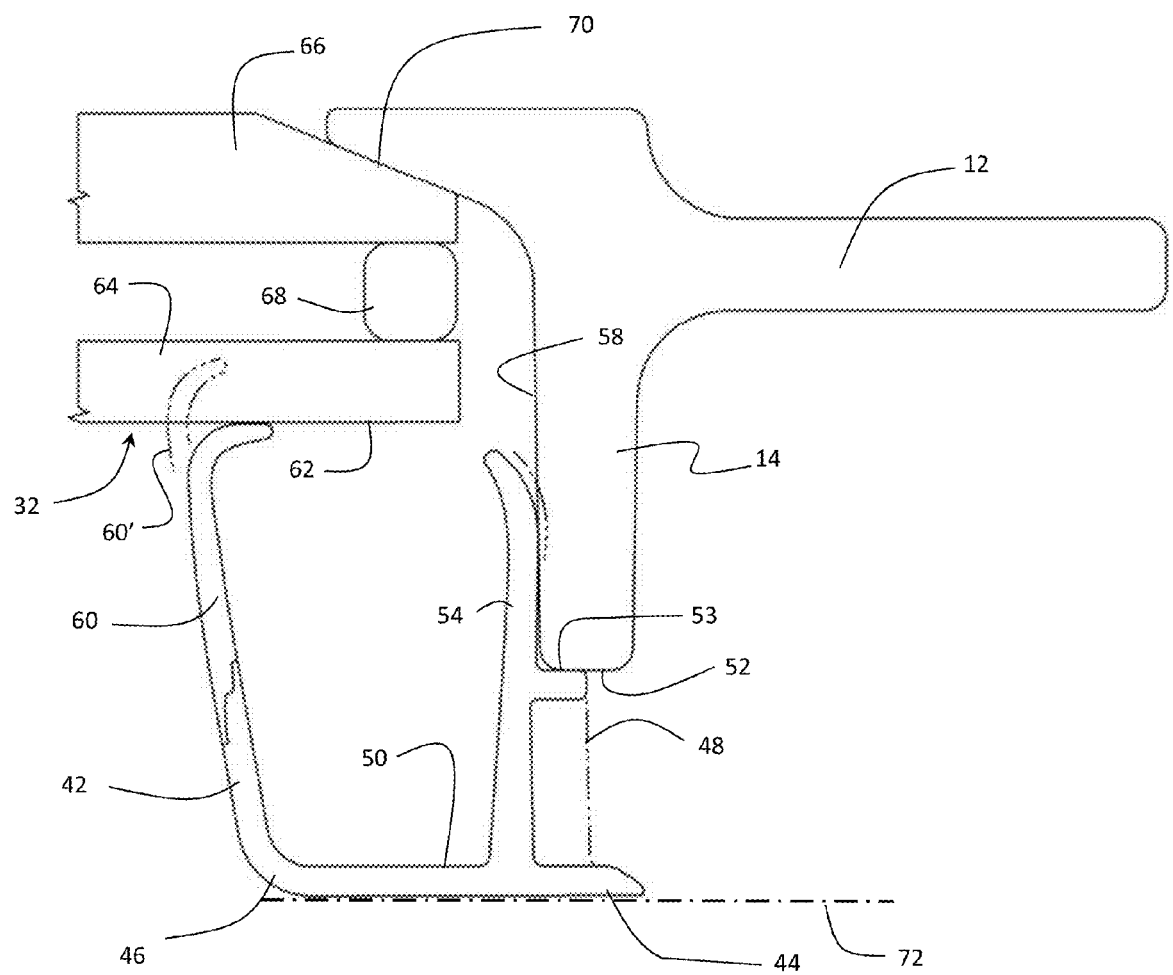
FIG. 6 is a section view of the interface ring as installed in a window structural ring.

Extending from the central wall 42 opposite the interface flange 44 is a resilient seal 60. As shown in FIG. 6, the resilient seal 60 is received against an internal surface 62 of window glass pane assembly 32 flexing from an initial position as represented in phantom 60'. In most installations, window glass pane assembly 32 incorporates an inner glass panel 64 and an outer glass panel 66 with an intermediate spacer 68. Clips 34, previously described with respect to FIG. 3, bear on the internal surface 62 urging the window pane assembly 32 into sealing contact with a support ramp 70 on the window ring 12 compressing a ring seal or seal band (not shown).

Resilient seal 60 provides a dust seal and an aesthetically pleasing and clean periphery for the window as viewed by the passenger. The resilience of the seal 60 absorbs inboard/outboard tolerance for the installation of the interface ring into the window ring. For exemplary embodiments, the resilient seal may be comolded with the interface ring using a softer durometer material such as silicone rubber (for example Laur Silicone, Inc. One Part LSR LS-7010-40) or similar material.

Figure 7A:
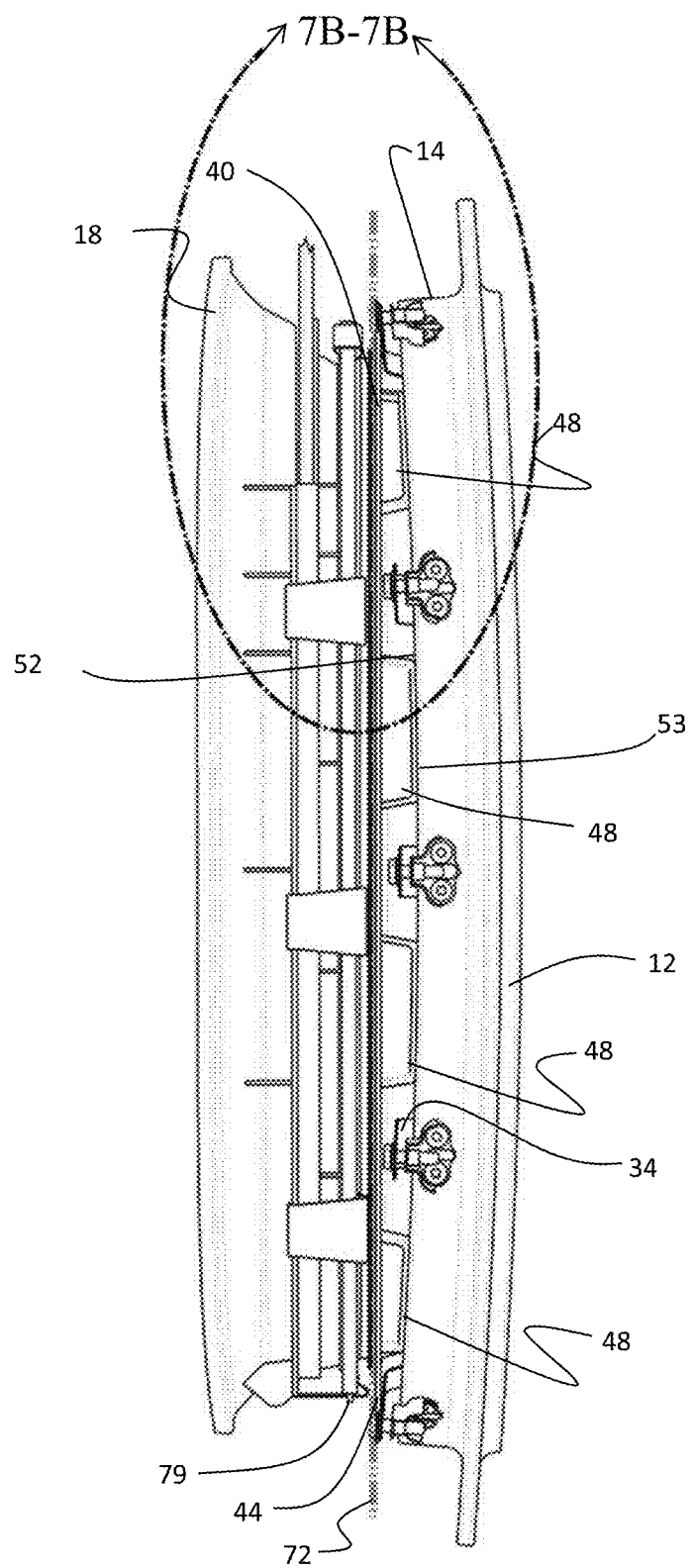
FIG. 7A is a side view of the window structural ring with the interface ring installed and a interior lining reveal mated to the interface ring.
Figure 7B:
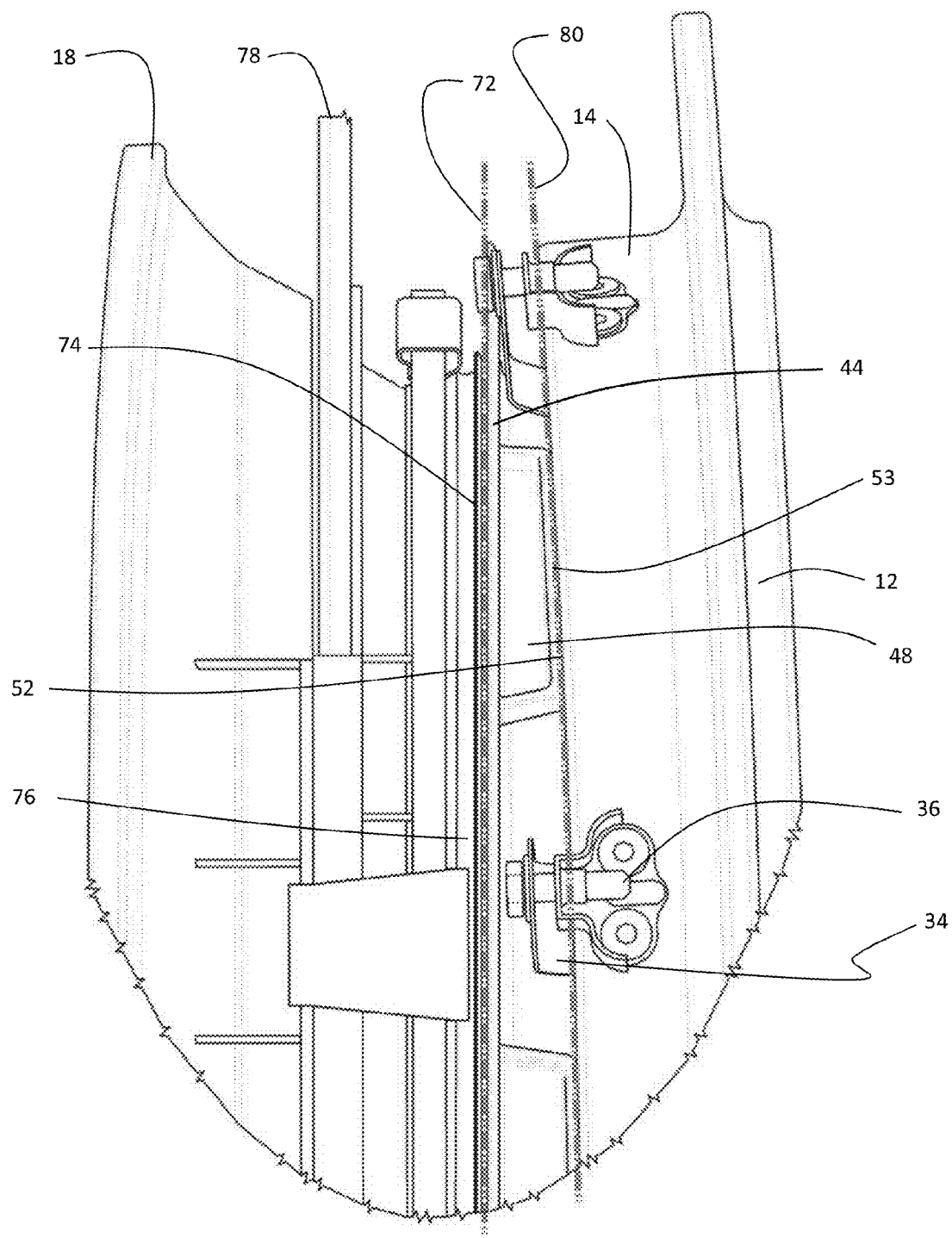
FIG. 7B is an expanded detail view 7B-7B in FIG. 7A.

FIGS. 7A and 7B demonstrate the engagement features of the interface ring 40 with both the window ring 12 and window reveal 18 of the interior lining panel 16. As seen in FIG. 7A, the inner edge 52 of the rim 14 in the window ring 12 has a curvature consistent with the overall curvature of the window ring as mated to the aircraft fuselage structure. The bearing ring bosses 48 are contoured to match the curvature of the rim 14 allowing the flange 44 of the interface ring to present a substantially flat surface as represented by plane 72. Circumferential spacing of the bearing ring bosses 48 on the flange prevents interference with the clips 34 and engaging fasteners 36 of the window ring 12. As best seen in FIG. 7B, the flat surface of flange 44 provides a low tolerance mating plane for the mating surface 74. The interface ring 40 transforms the complex mating surface curvature 80 of the rim 14 to the flat planer surface 72 of the flange 44.

Figure 8:
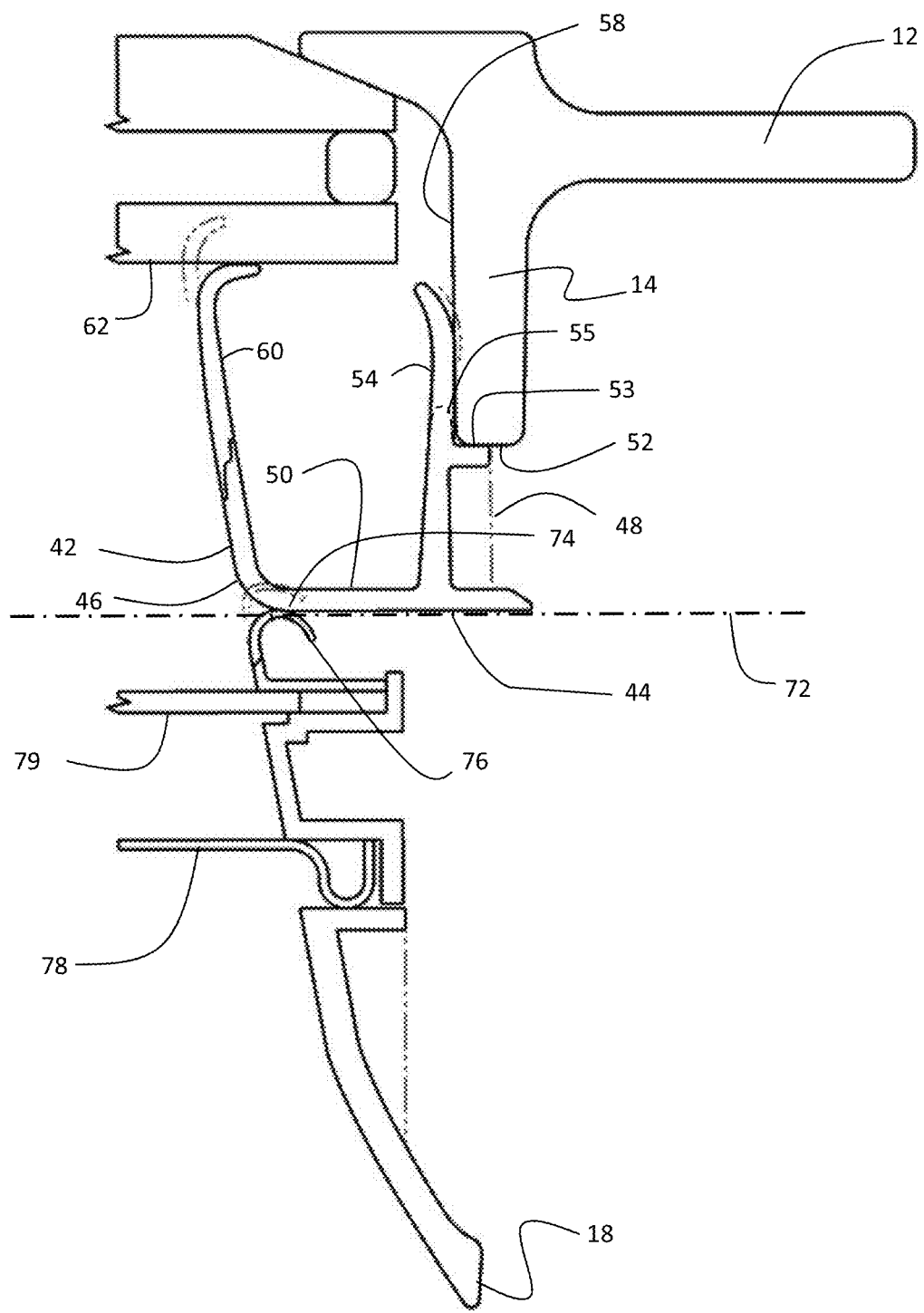
FIG. 8 is a section view of the interface ring with interior lining reveal mated showing the flat low tolerance mating surface of the interface ring; and, FIG. 9 is a flow chart of the window ring and interior lining window reveal mating method provided by the present embodiments.

FIGS. 7C and 7D demonstrate the difference in window reveal interface between the flat interface provided by the flange 44 of the interface ring 40 as shown in FIG. 7C and the constrained multiple curvature prior art installation as shown in FIG. 7D. The flat interface allows the window reveal to be substantially free floating in forward/aft, up/down and rotational adjustment As shown in FIG. 8, the window reveal 18 may employ a resilient seal 76 to create the mating surface 74 engaging the flange 44. The window reveal may include a window shade 78 vertically displacable to allow passenger view through the window and a dust cover pane 79. Flange 44 allows the window reveal 18 significant latitude in tolerance in forward/aft, up/down and clocking directions while presenting a clean surface to the passenger as viewed through the window reveal. The lining panel 16 and associated window reveal 18 is thereby allowed to float to wherever the installation bracket system for the lining panel imposes with misalignment accommodated by the flange 44. This significantly reduces the necessity of rework or reinstallation due to minor misalignments in the interior lining panels.

Figure 9:
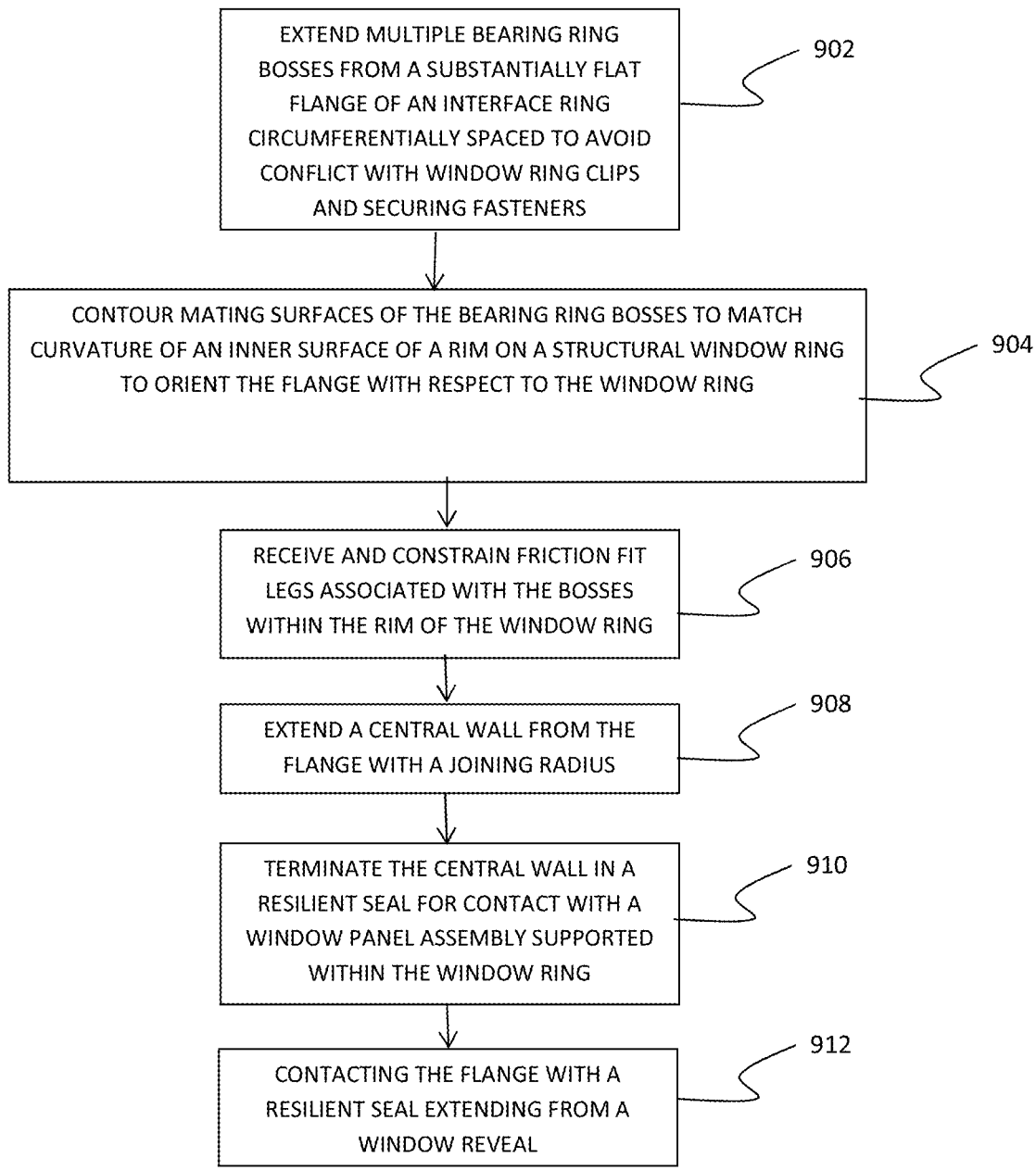

In operation as depicted in FIG. 9, the described embodiment provides multiple bearing ring bosses extending from a substantially flat flange of an interface ring circumferentially spaced to avoid conflict with window ring clips and securing fasteners, step 902. Contouring of mating surfaces of the bearing ring bosses to match curvature of an inner surface of a rim on a structural window ring orients the flange with respect to the window ring, step 904. Friction fit legs associated with the bosses are received and constrained within the rim of the window ring, step 906. A central wall extending from the flange with a joining radius, step 908, terminates in a resilient seal for contact with a window pane assembly supported within the window ring, step 910. Contacting the flange with a resilient seal extending from a window reveal, step 912, allows relaxed tolerance between an interior lining supporting the reveal and the window ring.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An interior lining interface comprising:
 a decorative interface ring having
  a flange having a substantially planar surface,
  a plurality of bearing ring bosses on an inner surface of the flange for engagement of an inner surface of a rim of a window ring having a complex curvature wherein the interface ring transforms the complex curvature of the window ring to the substantially planar surface of the flange,
  a plurality of friction fit legs extending from the flange and received within and constraining the interface ring to the widow ring rim; and,
 a window reveal associated with a lining panel and having a mating surface contacting the planar surface of the flange, said flange providing latitude in tolerance in forward/aft, up/down and clocking directions for said mating surface and said mating surface floating on said flange to accommodate misalignment between the window reveal in the lining panel and window ring.

2. The interior lining interface as defined in claim 1 wherein the decorative interface ring further comprises a central wall extending from the flange with a joining radius, said central wall received within the window ring.

3. The interior lining interface as defined in claim 2 further comprising a resilient seal extending from the central wall to contact a window pane assembly supported within the window ring.

4. The interior lining interface as defined in claim 3 wherein the decorative interface ring is molded from high durometer plastic and the resilient seal is comolded with the central wall.

5. The interior lining interface as defined in claim 4 wherein the resilient seal is a low durometer material.

6. The interior lining interface as defined in claim 5 wherein the high durometer plastic is selected from the set of polyphenylsulfone (PPSV) thermoplastic or polyetherimide (PEI) thermoplastic.

7. The interior lining interface as defined in claim 5 wherein the low durometer material is silicon rubber.

8. The interior lining interface as defined in claim 1 wherein the bearing ring bosses and friction fit legs are circumferentially spaced on the inner surface of the flange for clearance from structural mounting hardware in the window ring.

9. The interior lining interface as defined in claim 1 wherein the friction fit legs incorporate an angular termination to be received within the window ring rim.

10. An aircraft fuselage window system comprising:
 a window ring having a complex curvature mounted in a fuselage;
 a lining panel supported within the fuselage;
 a decorative interface ring mounted intermediate the window ring and lining panel and having
  a flange having a substantially planar surface wherein the interface ring transforms the complex curvature of the window ring to the substantially planar surface of the flange,
  a plurality of bearing ring bosses on an inner surface of the flange for engagement of an inner surface of a rim of a window ring,
  a plurality of friction fit legs and alignment lips extending from the bosses and received within and constraining the interface ring to the widow ring rim; and,
 a window reveal extending from the lining panel and having a mating surface contacting the surface of the flange, said flange providing latitude in tolerance in forward/aft, up/down and clocking directions for said mating surface and said mating surface floating on said flange to accommodate misalignment between the window reveal in the lining panel and window ring.

11. The aircraft fuselage window system as defined in claim 10 wherein the decorative interface ring further comprises a central wall extending from the flange with a joining radius.

12. The aircraft fuselage window system as defined in claim 11 wherein the window ring supports a window pane assembly and further comprising a resilient seal extending from the central wall to contact the window panel.

13. The aircraft fuselage window system as defined in claim 12 wherein the decorative interface ring is molded from high durometer plastic.

14. The aircraft fuselage window system as defined in claim 13 wherein the resilient seal is a low durometer plastic and the resilient seal is comolded with the central wall.

15. The aircraft fuselage window system as defined in claim 14 wherein the high durometer plastic is selected from the set of polyphenylsulfone (PPSV) thermoplastic or polyetherimide (PEI) thermoplastic and the low durometer material is silicone rubber.

16. The aircraft fuselage window system as defined in claim 12 further comprising clips attached to the window ring with engaging fasteners, said clips securing the window panel within the window ring and wherein the bearing ring bosses and friction fit legs are circumferentially spaced on the inner surface of the flange for clearance from the clips and engaging fasteners.

17. The aircraft fuselage window system as defined in claim 10 wherein the friction fit legs incorporate an angular termination to be received within the window ring rim.

18. A method fur establishing a low tolerance interface between a window ring and window reveal comprising:
 extending multiple bearing ring bosses on a substantially flat flange of an interface ring;
 contouring mating surfaces of the bearing ring bosses to match curvature of an inner surface of a rim on a structural window ring to orient the flange with respect to the window ring wherein the interface ring transforms the complex curvature of the window ring to the substantially planar surface of the flange;
 receiving and constraining friction fit legs associated with the bosses within the rim of the window ring;
 contacting the flange with a resilient seal extending from a window reveal.

19. The method of claim 18 further comprising circumferentially spacing the bearing ring bosses and friction fit legs to avoid conflict with window ring clips and securing fasteners in the window ring.

20. The method of claim 18 further comprising
 extending a central wall from the flange with a joining radius;
 terminating the central wall in a resilient seal for contact with a window pane assembly supported within the window ring.

* * * * *